Oct. 29, 1929.　　　F. H. TIDNAM ET AL　　　1,733,173
HOLDING MEANS AND KIT FOR SIGNALING APPARATUS FOR DISABLED VEHICLES
Filed Oct. 8, 1928
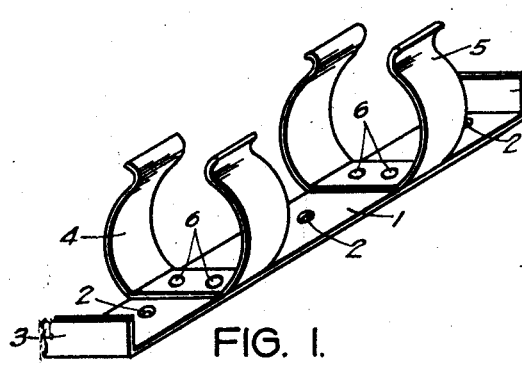
FIG. 1.
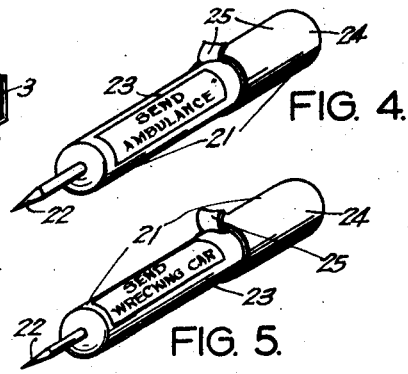
FIG. 4.
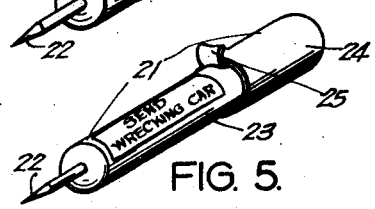
FIG. 5.
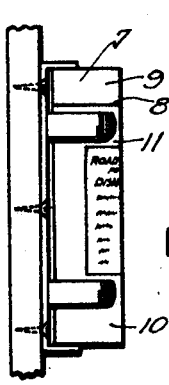
FIG. 2.
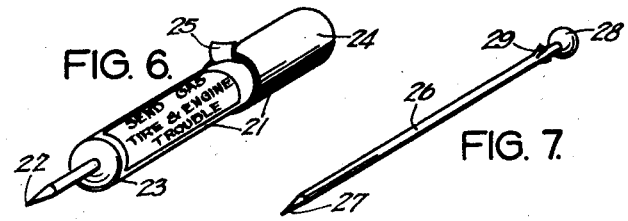
FIG. 6.　　FIG. 7.
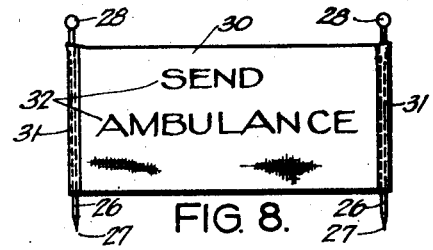
FIG. 8.
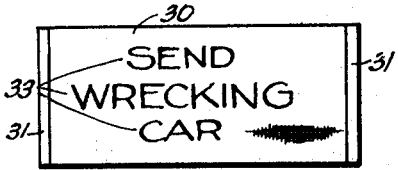
FIG. 9.
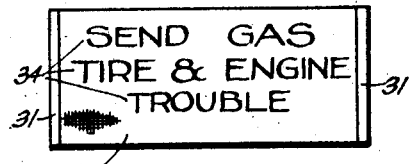
FIG. 10.
FIG. 3.

Patented Oct. 29, 1929

1,733,173

UNITED STATES PATENT OFFICE

FREDERICK H. TIDNAM AND FRANK S. PARTRIDGE, OF OKLAHOMA CITY, OKLAHOMA

HOLDING MEANS AND KIT FOR SIGNALING APPARATUS FOR DISABLED VEHICLES

Application filed October 8, 1928. Serial No. 311,228.

Our invention relates to holding means and kit for signaling apparatus for disabled vehicles.

The objects of our invention are to produce a device of the class described which will be new, novel and of utility; which will be simple, strong and compact; which may be easily and quickly attached to and detached from a tool box or other suitable part of a vehicle; which will securely hold the apparatus on an automobile; which can be quickly and easily opened and set up for signaling to the passing public; which will permit the easy removal of said signaling paraphernalia and of said kit; which will convey to the travelling public during both day and night the kind of message for the particular relief desired by the occupants of the disabled automobile, or vehicle; which will convey such message without the necessity of stopping the passing automobiles; which will result in the saving of lives and the relieving of long suffering by those injured in automobile accidents; which can be safely and securely carried when not in operation; and which will be efficient for all of the purposes for which our invention is intended.

The frequency of robberies has made it almost dangerous for passing automobiles to run the risk of stopping for those in distress at the sides of the road. So it often happens that an automobile having an accident is marooned by the side of the road for many hours before any one will assume the risk of stopping. This is all the more important since at times the occupants of the disabled car may have been badly hurt, and be in dire need of early help. Our device securely carries the communicating means, and makes the message sought to be conveyed easily understood by the passing car without its stopping and thereby makes the delivering of the message sought to be conveyed all the more speedy by the very reason that the passing car continues in its course without stopping.

With these and other objects in view as will more fully appear our invention consists in the construction, novel features, and combination of parts hereinafter more fully described, pointed out in the claims hereto appended, and illustrated in the accompanying one-sheet drawing, of which, Figure 1 is a perspective view of the flare container clip holder for carrying the communicating means; Fig. 2 is an elevational view of the container and clip holder mounted for carrying the communicating means; Fig. 3 is a plan view of the instruction sheet of said communicating means; Fig. 4 is a perspective view of the red flare of said communicating means; Fig. 5 is a perspective view of the yellow flare of said communicating means; Fig. 6 is a perspective view of the green flare of said communicating means; Fig. 7 is a perspective view of one of the standard supporting pins of said communicating means for the banner; Fig. 8 is an elevational view of the red banner of said communicating means hooked on to two supporting standards showing one use of the banners; Fig. 9 is an elevational view of the yellow banner of said communicating means; Fig. 10 is an elevational view of the green banner of said communicating means.

Like characters of reference designate like parts in all the figures.

It is understood that various changes in the form, proportion, size, shape, weight and other details of construction, within the scope of our invention may be resorted to without departing from the spirit or broad principles of our invention and without sacrificing any of the advantages thereof; also that the drawings are to be interpreted as being illustrative and not restrictive.

One embodiment of our invention is shown as follows: We provide a strong metallic longitudinal holding member 1 having perforations 2 for holding it with bolts, or other suitable holding means, to a suitable part of an automobile or tool box, said holding member 1 having upturned right angled ends 3 for securely holding the two parts 9 and 10 of the container 7 together, and for preventing the parts of the communicating means from escape from said container 7. This is an important feature owing to the fact that the container has therein flares which can be lighted by friction, and the constant motion of the car might cause the opening of the flare and the friction thereagainst to set off the flare, and a fire thereby be caused, and the opportunity for its use as a signal be thereby prevented. We also provide strong spring clips 4 and 5 fastened to said longitudinal member 1 by suitable holding means one form of which is shown at 6. These springs 4 and 5 are preferably formed of strong spring band metal and are sufficiently strong to hold the kit 7 and its contents securely therebetween, and yet so arranged as to quickly permit of the withdrawal of said container therefrom when a signal is desired to be made. Each clip is formed to bulge outwardly to fit and partially surround the sides of the cylindrical shaped kit and their outer free ends are adapted to turn outwardly to easily receive the kit when it is desired that it be held therebetween. We also provide a cylindrical container or kit 7. This is made sufficiently strong for holding the contents, and preventing the container or kit 7 from being perforated or destroyed by the motion of the car and the weight and sharpness of the tools, if any, in the tool chest when used within the tool chest. Said container or kit 7 is preferably divided at 8 into two end portions 9 and 10, end 9 telescoping snugly over the reduced portion 11 of end 10. When separated the withdrawal of the contents therefrom is made easily and quickly. The ease and quickness of their withdrawal, and the early giving of the signal often becomes of the utmost importance. The early placing of a signal may catch the attention of a passing car, when to let that car pass may leave the person in trouble stranded for hours on some sparsely travelled roads, day or night, before another car passes. In case of an injury this becomes extremely important. We provide road instructions 12 showing the red signal 13 to mean "Send ambulance serious accident" 14; yellow signal 15 to mean "Send wrecking car" 16; the green signal 17 to mean "Send gasoline" or "Tire or minor engine trouble," 18; also if in an emergency the one having the accident is out of red flares for indicating "Send ambulance serious accident" he may display the two flares yellow 15 and green 17 as shown at 19 to mean "Send ambulance. Serious accident." A part of the code is shown at 20: "Passing cars are not expected to stop. They will sound horn twice indicating they will report to nearest service station the location of car and color displayed." This road instruction is intended to be pasted or fastened to the outside surface of the container, and to also be inserted inside the kit or container 7 with the other contents. The reading on the outside may be defaced so as to be illegible, and the inside copy will furnish the information for the use of new users of the kit, and apparatus. It is expected after a reasonable length of time of the use of the apparatus and container the instructions will have become known generally to the automobile using public.

We also provide for the use of various colored flares. These may be of the common flares which are in use in railway work, or they may be especially made for this use. The flare 21 which we show in Fig. 4 is one of the flares in common use on railroads, construction gangs, and the like. They have a pointed spike 22 for sinking into the ground or pavement, a body portion 23, a cap portion 24, a tongue 25 for tearing off the cap. Said flare 21 is intended to be used in red color indicating the color of the flame when burning and has printed on its body portion the words "Send ambulance." A second flare as shown in Fig. 5 similar in form and construction to that shown in Fig. 4 is intended to be used for a yellow flare burning a yellow flame and having on the outside thereof the words "Send wrecking car." A third flare intended for use in the kit similar in form and construction to that shown in Fig. 4 is a green flare intended for indicating a green flame with the words on the outside thereof "Send gas." "Tire and engine trouble." These are designed to be used at night and will eventually be established and used by the flares alone, each one having its distinctive meaning; but for a time it might be wise to place in a suitable position with relation thereto the appropriate banner indicating the same thing intended to be conveyed by the use of the respective and appropriate flare. We provide supporting standards, being adapted for supporting the banners 31, being preferably formed of a flag-staff or a metallic rod having a body 26, a sharpened point 27, and a head or knob 28. A portion 29 thereon may be provided for fastening the banner thereto. We also provide a set of three separate banners 31, being preferably made out of cloth, or other suitable material, having a casing 31 at each end for the insertion therethrough of one of said supporting standards. The cloth, or other suitable material, in one of the banners is preferably red in color, and has thereon the wording "Send ambulance" 32. This is best shown at Fig. 8. The material in another one is preferably yellow in color and has thereon the wording "Send wrecking car" 33. This is best shown at Fig. 9. The material in another one is preferably green in color and has the words "Send gas. Tire and engine trouble" 34. This is best shown at Fig. 10. These are intended for daylight use, and for conveying such respective messages to the passing traveling public as may be proper and desirous. They may also at night be placed reasonably closely adjacent one of the flares for aiding in conveying the message desired, which banner corresponds in the message sought to be conveyed with the message indicated by the flare then being used. Other banners with other messages as desired may be also used in connection with the supporting standards and flares; but in order to establish a code for the relief of unfortunate travelers the above is preferred.

It has been our desire to work this out so as to relieve the situation as much as possible from passing motorists receiving or getting the impression of a possible "hold-up" or some other kind of a false scheme. We think therefore it would not be best to locate the flare or the banner any considerable distance from the immediate scene of the accident. If this were done the stopping would throw them at about the location of the accident, and handy for a possible hold-up. This is not of great importance, however, when it is established that the passing motorist is not expected to stop, but to sound his horn twice to indicate that he has the message and will report it at the next service station.

The flares and supporting rods can easily be rolled in the banners, and the instructions 12 rolled around them. They can all easily and quickly be placed in the lower portion 10 of the kit or container, and the upper portion 9 thereof be placed thereover. The contents can be easily removed therefrom as considerable of the upper ends of the contents will be exposed above the division 8 of said container.

Having thus described our invention what is claimed and desired to be secured by Letters Patent is:

1. A holding means and kit for signaling apparatus for disabled vehicles, as described, embodying a telescoping two-piece cylindrical kit, a longitudinal strip member adapted to be secured to a suitable part of an automobile, said strip having upturned end portions for holding said two-piece kit in closed relation, a plurality of spring clips fastened to said longitudinal member adapted to securely hold said container until manually removed.

2. A holding means for holding a cylindrical telescoping kit, embodying a flat metal rectangular base member having each end portion bent perpendicular to its body portion for holding said kit closed, said body portion adapted to be secured to a suitable part of an automobile with said perpendicular end portions extending outward and having a pair of band spring clips spacedly attached thereacross for receiving and holding said kit.

3. A holding means for holding a cylindrical telescoping kit, embodying a pair of suitably resilient band spring clips each substantially circular having a space between their revolutely turned ends, each attached laterally at their mid-portions spacedly across a base member adapted to be secured to a suitable part of an automobile, said clips adapted to receive said kit between their end portions and to hold same, until manually removed, within their substantially circular portions, said base member having each end portion bent perpendicularly for holding said kit closed when supported within said clips.

4. A device, as described, embodying a kit for containing communicating means for distress signaling, comprising two metal telescoping cylindrical members each having one end closed, holding means for said kit comprising a flat metal rectangular member having each end portion bent perpendicular to its body portion, said body portion adapted to be secured to a suitable part of an automobile with said perpendicular end portions extending outward, a pair of band spring clips each substantially circular having a space between their revolutely turned ends, each attached laterally at their mid-portions spacedly across said body portion, said clips adapted to receive said kit, when telescoped, between their end portions and to hold same, until manually removed, within their substantially circular portions, said perpendicular end portions of said rectangular member adapted to hold said kit closed when supported by said holding means.

FREDERICK H. TIDNAM.
FRANK S. PARTRIDGE.